United States Patent
Buchenau et al.

(10) Patent No.: US 9,836,986 B2
(45) Date of Patent: Dec. 5, 2017

(54) DYNAMIC RESPONSE ENTRY

(71) Applicant: Pearson Education, Inc., Upper Saddle River, NJ (US)

(72) Inventors: Marion Buchenau, San Francisco, CA (US); Linda A. Gerardi, Saddle River, NJ (US); Thomas A. Hanagan, Novato, CA (US); David E. McGivney, Novato, CA (US); Stephen D. Gravrock, Larkspur, CA (US); Athena Despo Anagnostopoulos, San Mateo, CA (US); Maximilian Kevin Bielenberg, San Mateo, CA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 621 days.

(21) Appl. No.: 14/284,281

(22) Filed: May 21, 2014

(65) Prior Publication Data

US 2014/0351253 A1 Nov. 27, 2014

Related U.S. Application Data

(60) Provisional application No. 61/825,787, filed on May 21, 2013.

(51) Int. Cl.
*G06F 17/30* (2006.01)
*G09B 7/06* (2006.01)

(52) U.S. Cl.
CPC ......... *G09B 7/06* (2013.01); *G06F 17/30678* (2013.01)

(58) Field of Classification Search
CPC ........ G09B 7/06; G09B 5/00; G06F 17/30678
USPC .................. 707/737; 434/322, 323, 336, 350
See application file for complete search history.

(56) References Cited

U.S. PATENT DOCUMENTS

| 9,082,309 B1* | 7/2015 | Fuka | G09B 7/00 |
| 2014/0030686 A1* | 1/2014 | Stambaugh | G09B 5/00 434/322 |
| 2014/0162238 A1* | 6/2014 | Carney | G09B 5/08 434/350 |

* cited by examiner

*Primary Examiner* — Evan Aspinwall
(74) *Attorney, Agent, or Firm* — Kilpatrick Townsend & Stockton LLP

(57) ABSTRACT

Methods, systems, and devices for dynamic response entry are disclosed herein. In some embodiments, a dynamic response entry system can include a user device that can be a proctor device or a testee device. The testee device can display a list to a testee for a predetermined time period. After the passing of the predetermined time period, the displaying of the list to the testee can be terminated. The testee can provide response to one or several questions, which responses can be input into the proctor device. The input responses can be evaluated and categorized and displayed according to the evaluation and categorization.

18 Claims, 7 Drawing Sheets

DYNAMIC RESPONSE ENTRY

CROSS-REFERENCES TO RELATED APPLICATIONS

This application claims the benefit of U.S. Provisional Application No. 61/825,787, filed on May 21, 2013, and entitled "DYNAMIC RESPONSE ENTRY," the entirety of which is hereby incorporated by reference herein.

BACKGROUND OF THE INVENTION

This disclosure relates in general to learning and can include traditional classroom learning or on-line or computerized learning, and specifically to testing that can be a part of or associated with learning. Testing can be used to verify the degree to which a student has mastered a subject and/or developed one or several skills. In certain tests, a proctor received answers from the student and creates a record of these answers. Traditionally, limitations on the speed with which the record of the answers can be created has limited the effectiveness of this type of test. Thus, better methods and systems are desired to improve testing.

BRIEF SUMMARY OF THE INVENTION

One aspect of the present disclosure relates to a method of dynamic response entry. The method includes receiving a task from a battery database, which battery database can include a plurality of tasks associated with a test, receiving list data from a list database, which list data can include data indicating a plurality of items, and providing a task to a user, which task can include temporarily providing the list to the user and requesting the user to identify the items from the list. The method can include receiving an input, which input indicates a user identified item, and identifying a group associated with the list. In some embodiments, identifying the group can include receiving data from the list database indicating the group for at least one of the items. The method can include determining an input status, which input status can indicate whether the input identifies an item in the list. In some embodiments, determining whether the input identifies an item in the list can include converting the input to a format and data type corresponding to the format and data type of the list data, and determining if the input is identified in the list data. The method can include associating an identifier with input, which identifier indicates if the input is identified in the list data. In some embodiments, the identifier is associated with the input according to a Boolean function. In one such embodiment, a first value is assigned if the input identifies an item that is identified in the list data and a second value is assigned if the input identifies and item that is not in the list data. The method can include displaying the input and the input status.

In some embodiments, determining the input status can include determining if the input is identified in the group associated with the list. In some embodiments, the method can include associating a second identifier with input, which the second identifier indicates if the input is in the group associated with the list. In some embodiments, the second identifier is associated with the input according to a Boolean function, and in some embodiments a first value is assigned if the input identifies an item that is identified in the group and a second value is assigned if the input identifies and item that is not in the group.

In some embodiments of the method, determining the input status further includes determining if the input is a repeat input. In some embodiments, determining if the input is a repeat input can include retrieving input data from a response database, which input data identifies a previously received input, comparing the input to the input data, and identifying the input as a repeat input if the input matches input data corresponding to a previously received input. In some embodiments, the method includes associating a third identifier with input, which third identifier indicates if the input is a repeat input. In some embodiments, the third identifier is associated with the input according to a Boolean function, and in one such embodiment a first value is assigned if the input is a repeat input and a second value is assigned if the input identifies and item that is not a repeat input.

In some embodiments of the method, displaying the input and the input status can include retrieving the identifier associated with the input and displaying an input status according to the identifier associated with the input. In some embodiments, the identifier can indicate one of whether the input is included in a list or group and whether the input is a repeat input.

One aspect of the present disclosure relates to a method of dynamic response entry. The method includes receiving a task from a battery database, which battery database can include a plurality of tasks associated with a test, receiving list data from a list database, which list data can include data indicating a plurality of items, and providing a task a user, which task can include temporarily providing the list to the user and requesting the user to identify the items from the list. The method can include providing an input region, receiving a first input, which first input can be the electronic capture of handwriting indicating a user identified item in a first input area, receiving an indication of the completion of the providing of the first input, providing an additional input region, determining whether an additional input is provided, which can include determining whether a signal indicative of an additional input is received, and storing the first input.

In some embodiments, the method can include displaying the first input in an answer list, and in some embodiments, the method includes determining a status of the first input. In some embodiments, the status of the first input indicates at least one of whether the input is included in a list or group and whether the input is a repeat input. In some embodiments, the method includes determining the status of the first input. This determination can include retrieving categorization data from a database and comparing the categorization data to the first input. In some embodiments, the categorization data can include one of list data, which list data can include data indicating a plurality of items, group data, which group data can identify a subset of the plurality of items in the list data, and input data, which input data can identify a previously received input.

In some embodiments, the method includes providing a button region to the user, which button region can include a plurality of input buttons. In some embodiments, providing the button region can include generating the plurality of input buttons. In some embodiments, each of the plurality of input buttons can be associated with an item identified in list data. In some embodiments, the list data can include data indicating a plurality of items.

Further areas of applicability of the present disclosure will become apparent from the detailed description provided hereinafter. It should be understood that the detailed description and specific examples, while indicating various embodi-

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides a method for dynamic response entry including, temporarily providing a list of words to a user, receiving an input from the user allegedly identifying one of the words of the list, and characterizing the user provided input. In some embodiments, this characterization can include identifying whether the user input accurately identifies one of the words of the list, identifying whether the user input repeats an already provided input, and/or determining whether the user input is in a category associated with one of the words in the list of words.

In one embodiment, the present disclosure provides a method for dynamic response entry including, a method to allow the rapid input via handwriting of the user answer. In some embodiments, for example, this can include providing a first region for receiving a first input, receiving the first input, determining when the first input is completed, providing a second region for receiving a second input, storing the first input, and determining if another input is being received. In some embodiments, determining when the first input is completed can include, for example, receiving a signal indicative of the completion of the first input. The signal can be generated, for example, when the user selects the second region for providing input, when the user actuates a key or button to generate a signal of the completion of the first input, after a specified amount of time has passed since the user last took action resulting in the generation of a portion of the first input, and/or when the user takes any other action to generate a signal indicative of the completion of the first input.

Figure 1:
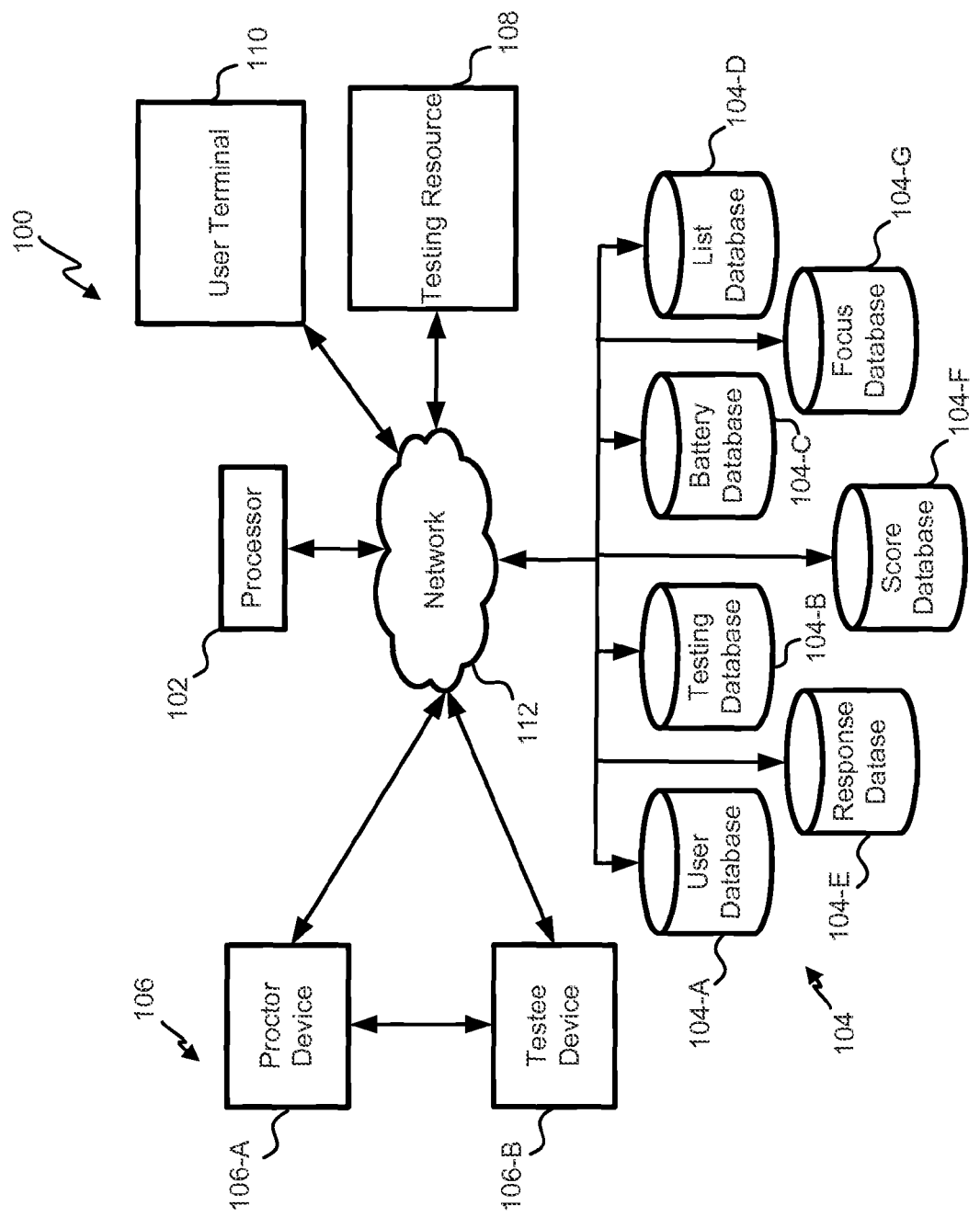
FIG. 1 is a block diagram illustrating one embodiment of a dynamic response entry system.

With reference now to FIG. 1, a schematic illustration of one embodiment of a system for dynamic response entry 100 is shown. In some embodiments, for example, the system 100 can provide hardware, features, and/or software that can accelerate the rate with which a user can enter a response. Advantageously, in some embodiments, these features can allow a test proctor to input answers received from a testee as quickly as the testee is able to speak and/or indicate the answers.

The system 100 can include, a processor, one or several databases, one or several user devices, one or several testing resources, and/or one or several user terminals. The system 100 can receive testing information from the testing resource and/or from one of the databases, can provide a task to the testee via one or several of the user devices, can receive an input and/or an answer from the testee via one or more of the user devices, and can categorize the input and/or answer with the processor and/or one or more of the user devices.

The system 100 can include a processor 102. The processor 102 can provide instructions to and receive information from the other components of the system 100. The processor 102 can act according to stored instructions, which stored instructions can be located in memory associated with the processor 102 and/or in other components of the system 100. The processor 102 can comprise a microprocessor, such as a microprocessor from Intel® or Advanced Micro Devices, Inc.®, or the like.

The system 100 can include one or several databases 104. The one or several databases 104 can comprise stored data relevant to the functions of the system 100. The one or several databases 104 include a user database 104-A, a testing database 104-B, a battery database 104-C, a list database 104-D, a response database 104-E, score database 104-F, and/or a focus database 104-G.

In some embodiments, for example, the user database 104-A can comprise information relating to a user. This user can be, for example, a proctor, a testee, a supervisor, a recipient of the testing results, and/or any other desired individual or entity. In some embodiments, the user database 104-A can include information relating to the user. This information can include, for example, a user profile. The user profile can include information identifying the user. Including the user's name, age, birth date, race, gender, socioeconomic information, and/or any other information useful in identifying the user and/or a characteristic of the user. In some embodiments, the user profile can include experiential information relating to the user and/or medical information relating to the user. In some embodiments, the experiential information can include information relating to the user's education and/or educational level, relating to the user's past work experiences or to any other of the users important life experiences. In some embodiments, the medical information relating to the user can include details of the user's medical history such as, for example, information relating to any medical problems the user has had or that the user is prone to.

The user database 104-A can further include user login information. This information can include, for example, information identifying a user such as, for example, a username and password or a user identification number. In some embodiments, for example, when a user desires to access the academic integrity system 100, the user can be prompted to enter identification information which can include a username and password or a user identification number. After the user provides the identification information, the academic integrity system 100 can verify the identification information, and specifically, the processor 102 can compare the user provided identification information to information stored within the profile database 104-A to determine if the user is an authorized user.

The testing database 104-B can include testing information. In some embodiments, for example, the testing information stored in the testing database 104-B can include one or several tests. These one or several tests can comprise one or several questions or tasks and data for evaluating and/or scoring the responses received to the one or several questions or tasks. In some embodiments, the testing information stored in the testing database 104-B can be specific to a user such as, for example, the proctor, supervisor, or intended recipient of the testing results. In some embodiments, the testing information stored in the testing database 104-B is nonspecific to the testee user.

The battery database 104-C can include a subset of information from the testing database 104-B that is associated with a testee. In some embodiments, for example, the battery database 104-C can include a compilation of one or several questions or tasks for providing to the testee. The battery database 104-C can further include information for evaluating and/or scoring the responses received to the one or several questions or tasks associated with the testee in the battery database.

The list database 104-D can include information relating to a subset of tasks or questions associated with the testee in the battery database 104-C. In some embodiments, for example, the task can include a list of items such as words. In performing the task, the proctor can temporarily provide these items to the testee, and can then ask the testee to recall as many of the items from the list as possible. In such an embodiment, the list database 104-D can include the list of items associated with the task. In some further embodiments, some or all of the items from the list can be associated with a group. This group can identify a commonality of the items. In one embodiment, for example, the list may include "beet," "carrot," and "chard" which items may be associated with the group "vegetable." In some embodiments, this group can identify items on the list belonging to the group, as well as items that belong to the group and are not on the list. In some embodiments, the list database 104-D can include information associated with an item that identifies one or several groups associated with the item, and any list associated with the item.

The response database 104-E can comprise a data record of inputs and/or testee answers provided in response to a question and/or task. In some embodiments, the response database 104-E can further include information linking each input and/or testee answer with the question and or task that it is associated with, with the battery and/or test with which it is associated, and/or the users, including, for example, the testee and/or proctor, with which it is associated.

The score database 104-F can comprise data identifying a testee score on a question and/or task, on a collection of questions and/or tasks, on one or several tests and/or components thereof, or on the battery. In some embodiments, the data in the score database 104-F can include data associating the score with the one or several questions and/or tasks that prompted the input and/or testee answer leading to the score.

The focus database 104-F can comprise data identifying interrelations between tasks in the testing database 104-B and/or battery database 104-C, and/or interrelations between the one or several questions and/or tasks in the list database 104-D. In some embodiments, for example, this data identifying interrelations can include identifying the type of information provided by one or several tasks and/or component thereof, including, for example, one or several questions and/or tasks.

In some embodiments, the information within the focus database 104-F can identify one or several tests and/or test components that gather information relating to an attribute of the testee. In some embodiments, one test may generally focus on the testee attribute, another test may focus on a specific aspect of the testee attribute, and an additional test may provide detail to a subcomponent of the specific aspect of the testee attribute. Further, in some embodiments the focus database 104-F can include information identifying the different levels of test focus. Thus, the focus database 104-F can provide information that can be used to narrowly target a testee attribute or aspect of the testee attribute by identifying the test that generates this information.

The system 100 can include one or several user devices 106. The one or several user devices 106 can be configured to allow a user to communicate with the other components of the system 100. In some embodiments, the user devices 106 can include a proctor device 106-A and a testee device 106-B. In some embodiments, the proctor device 106-A and the testee device 106-B can be configured to communicate with each other via other components of the system 100 and in some embodiments, the proctor device 106-A and the testee device 106-B can be configured to directly communicate with each other. The details of the user devices 106 will be discussed at greater length below.

The system 100 can include a testing resource 108. In some embodiments, for example, the testing resource 108 can comprise the source of tests that are stored in the testing database 104-B. The testing resource 108 can comprise, for example, a test vendor, a test developer, or a test encoder.

The system 100 can include a user terminal 110. The user terminal can comprise features configured to allow a user to access the system 100. In some embodiments, for example, the user terminal 110 can be co-located in one or several of the user devices 106. In some embodiments, the user terminal can comprise a network interface configured to allow the user to interface with the other components of the system 100 and the user interface configured to allow the user to interface with the user terminal 110. In some embodiments, the user terminal 110 can be used to generate a test battery stored in the battery database 104-C from tests stored in the testing database 104-B.

The system 100 can include a network 112. The network 112 allows communication between the components of the system 100. The network 112 can be, for example, a local area network (LAN), a wide area network (WAN), a wired network, wireless network, a telephone network such as, for example, a cellphone network, the Internet, the World Wide Web, or any other desired network. In some embodiments, the network 112 can use any desired communication and/or network protocols.

Figure 2:
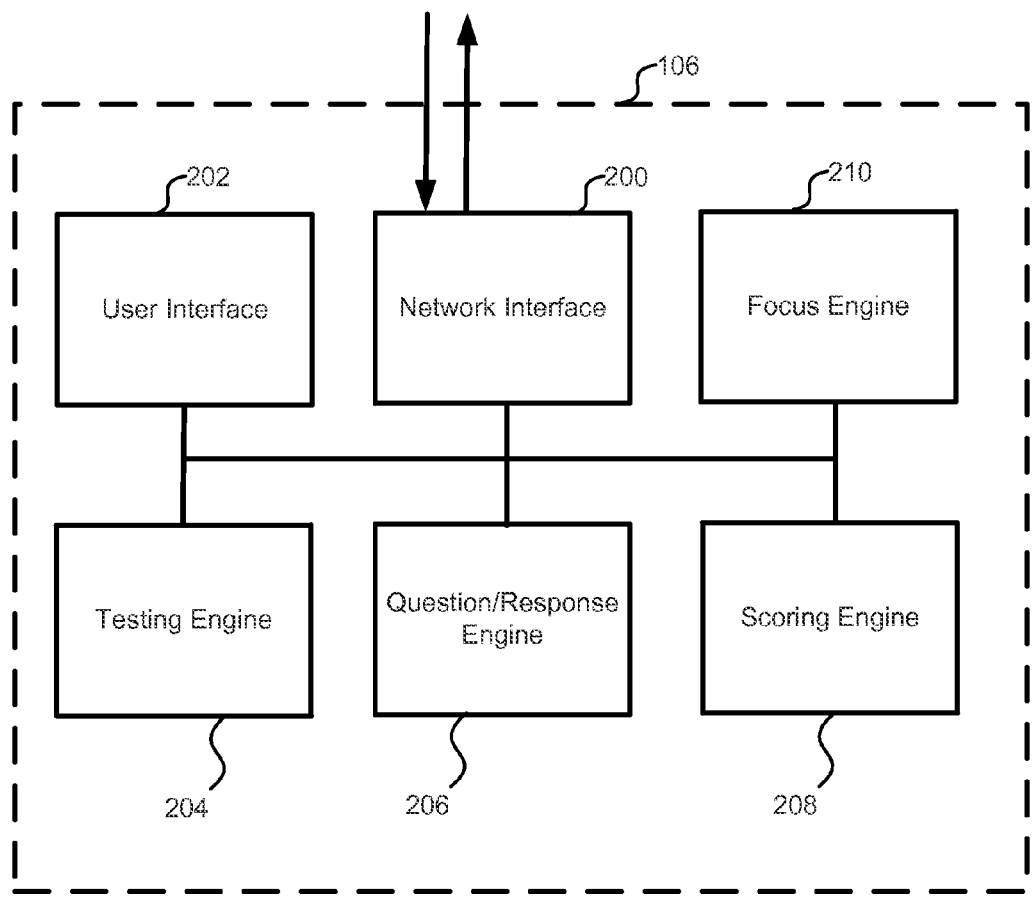
FIG. 2 is a block diagram illustrating one embodiment of a user device for use with dynamic response entry system.

With reference now to FIG. 2, a block diagram of one embodiment of a user device 106 is shown. As discussed above, the user device 106 can be configured to provide information to and/or receive information from other components of the system 100. The user device can access the system 100 through any desired means or technology, including, for example, a webpage or a web portal. As depicted in FIG. 2, the user device 106 can include a network interface 200. The network interface 200 allows the user device 106 to access the other components of the system 100, and specifically allows the user device 106 to access the network 112 of the system 100. The network interface 200 can include features configured to send and/or receive information, including, for example, an antenna, a modem, a transmitter, receiver, or any other feature that can send and/or receive information. The network interface 120 can communicate via telephone, cable, fiber-optic, or any other wired communication network. In some embodiments, the network interface 200 can communicate via cellular networks, WLAN networks, or any other wireless network.

The user device 106 can include a user interface 202 that communicates information to, and receives inputs from a user. The user interface 202 can include a screen, a speaker, a monitor, a keyboard, a microphone, a mouse, a touchpad, a keypad, and/or any other feature or features that can receive inputs from a user and provide information to a user.

The user device 106 can include a testing engine 204. The testing engine 204 can be used to facilitate and/or manage the providing of a test to a testee. In some embodiments, for example, the testing engine 204 can be used by the proctor to provide and manage the testing provided to the testee including, for example, selecting one or several tests for inclusion in the testing battery, editing the testing battery, and/or editing one or several of the tests included in the test battery.

The user device 106 can include a question/response engine 206. The question/response engine 206 can facilitate providing a question and/or task to the testee and providing a testee input and/or answer to the question and/or task. In some embodiments, for example, the question/response engine 206 can include features to facilitate the proctor in providing a question and/or task to the testee. In some embodiments in which the question and/or task includes temporarily providing a list of items to the testee, the question/response engine 206 can include features to temporarily provide the list of items to the testee. In some embodiments, for example, the list of items to be temporarily provided to the testee by temporarily displaying the items to the testee such as, for example, by the testee device 106-B, by prompting the proctor to read the items to the testee such as, for example, by indicating that the proctor should read an item from the list, indicating that the proctor should read all the items from the list, and/or indicating a tempo and/or timing that the proctor can follow in reading the items from the list, and/or by using speech software and a feature of the user device 106 such as a speaker to audibly communicate the items to the testee.

In some embodiments, the question/response engine 206 can include features configured to facilitate the testee in providing an input and/or answer to the question and/or task. In some embodiments, for example, these features can include features configured to detect and record the testee's answers, to recognize the testee's answers such as by, for example, the use of speech recognition software, and/or to provide the proctor with the ability to provide inputs to the system 100 corresponding to the testee's answers. In some embodiments, for example, the proctor can provide inputs to the system 100 corresponding to the testee's answers by selecting a word and/or item corresponding to the testee answer, by typing the testee answer, by handwriting the testee answer, or by verbally repeating the testee answer.

The user device 106 includes a scoring engine 208. The scoring engine 208 can be configured to evaluating score of the one or several testee inputs and/or answers. In some embodiments, for example, scoring engine 208 can be configured to retrieve scoring information from the scoring database 104-F and/or from the testing database 104-B, and to generate a score for the one or several inputs and/or answers.

The user device 106 includes a focus engine 210. The focus engine 210 can be configured to retrieve the score from the scoring engine 208 and/or from the scoring database 104-F, and to receive focus information from the focus database 104-G. In some embodiments, for example, the focus engine 210 can use the score and the information received from the focus database 104-G to determine further tests that can be provided to the testee to further identify and and/or evaluate a testee attribute. In some embodiments, for example, this testee attribute can be selected by the intended recipient of the testing results, and in some embodiments, this testee attribute can be selected based on the comparison of the testee achieved score to a threshold. Thus, in some embodiments in which the testee score is less than, the same as, or more than the threshold value, the focus engine 210 can recommend additional testing based on the testee performance.

Figure 3:
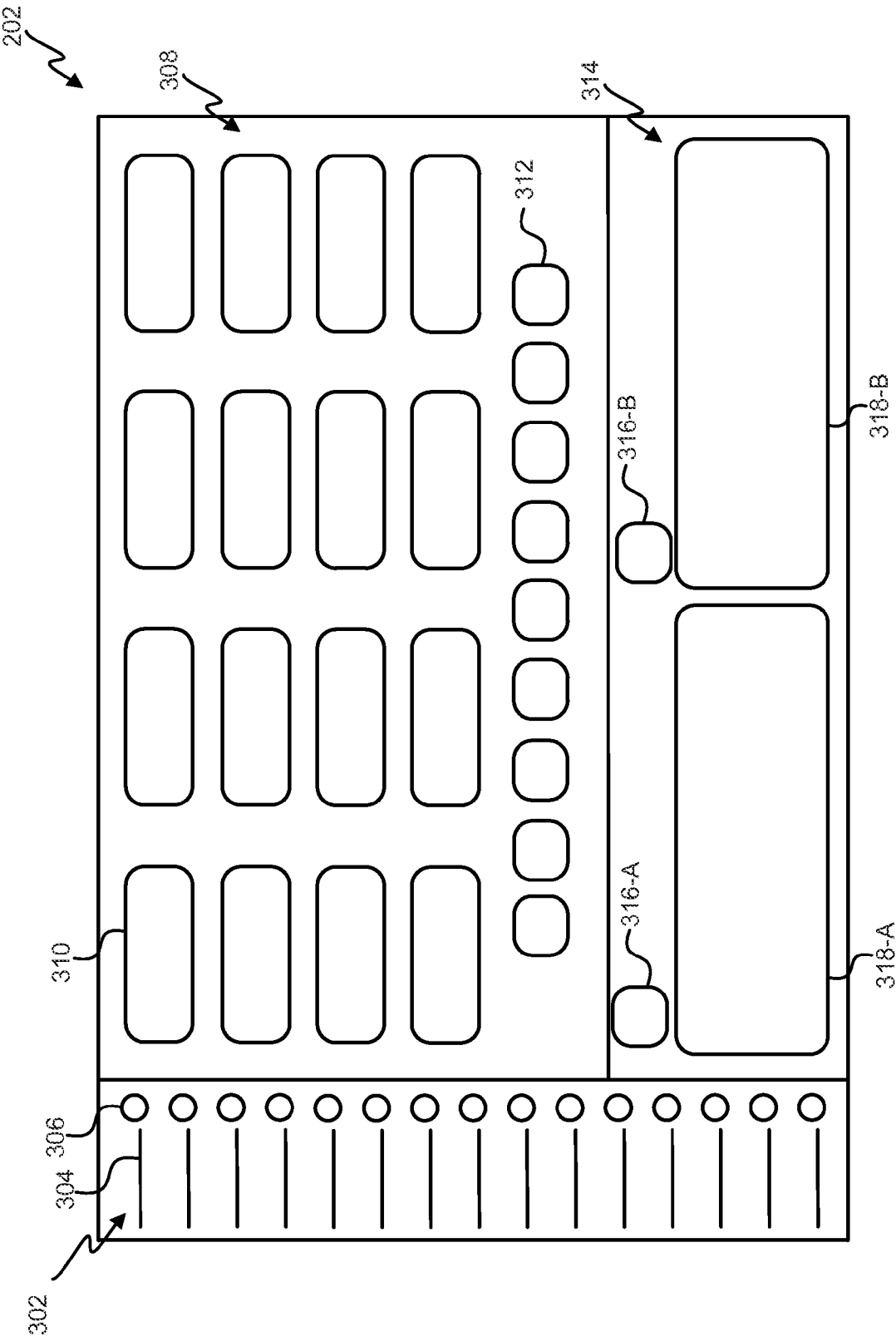
FIG. 3 is a schematic illustration of one embodiment of a user interface that is part of the user device.

With reference now to FIG. 3, a schematic illustration of one embodiment of a user interface 202 performing dynamic response entry is shown. In some embodiments, for example, the user interface 202 can be provided on one or more of the user devices 106 and/or on the user terminal 110. In some embodiments, for example, the user interface 202 can include features that can be configured to facilitate the proctor in dynamic response entry. The user interface 202 can operate according to the software and components of the one or several user devices 106.

The user interface 202 can comprise an answer list. The answer list 302 can comprise an area in which the testee provided one or several inputs and/or answers can be displayed. The answer list 302 can include an item display 304 in which a testee provided item can be displayed, and a status display 306 in which the status of the testee provided item can be displayed. In some embodiments, for example, these answers can be displayed in a plurality of item displays 304 in a list format and can be chronologically sorted according to when the input and or answer was received. In some embodiments, for example, a status associated with the one or more inputs and/or answers can be displayed in the status display 306 of answer list 302.

The user interface 202 can include a button region 308. In some embodiments, for example, the button region 308 can include a plurality of buttons. As depicted in FIG. 3, the button region 308 includes an input button 310. The input button 310 can allow a user to select an item from the list of items by operating the input button 310. In one embodiment in which the user devices 106 include, for example, a touch screen, the input button 310 can be operated by touching the portion of the touchscreen overlaying the displayed input button 310. As further seen in FIG. 3, the button region 308 can include a status button 312. In some embodiments, for example, the status button 312 can allow a user to select a status for an input item. In some embodiments, for example, a status can be assigned to an input item including, for example, whether the input item is a repeat input item in that it has been provided multiple times by the testee, whether the item is an intrusion in that it is not on the list, whether the item is non-category in that it does not belong to a group associated with the list, and/or whether the item is a synonym for an already provided and/or listed item. In some embodiments, the status button 312 can be operated at the time that an input is provided and can be used to assign a status to the input. In some embodiments, the status button 312 can be used to edit and/or update the status of an item that has already been input and provided with status.

The user interface 202 can include a manual input region 314. In some embodiments, for example, the manual input region 314 can include features configured to allow a user such as, for example, the proctor to input a testee answer into the user device. This manual input region can be configured to allow a user such as a proctor to input a testee answer via, for example, a microphone, a keyboard, and/or handwriting. In some embodiments, the manual input region 314 can include a button 316 configured to indicate when an input of a testee answer is complete, and a display box 318 for displaying of the user provided testee answer. In the specific embodiment depicted in FIG. 3, the manual input region 314 includes a first display box 318-A and a second display box 318-B. In some embodiments, the first and second display boxes 318-A, 318-B can be simultaneously provided to the user, and in some embodiments, the first and second display boxes 318-A, 318-B can be serially provided to the user. Thus, in some embodiments, the first and second display boxes 318-A, 318-B can be both provided to the user in the manual input region 314 at the same time, and in some embodiments, the first and second display boxes 318-A, 318-B can be serially provided to the user so that a new display box is provided when the input in the previous display box is completed.

As further depicted in FIG. 3, the first display box 318-A is associated with a first button 316-A and the second display box 318-B is associated with a second button 316-B. The details of the use of the display boxes 318-A, 318-B and the buttons 316-A, 316-B will be provided in below.

Figure 4:
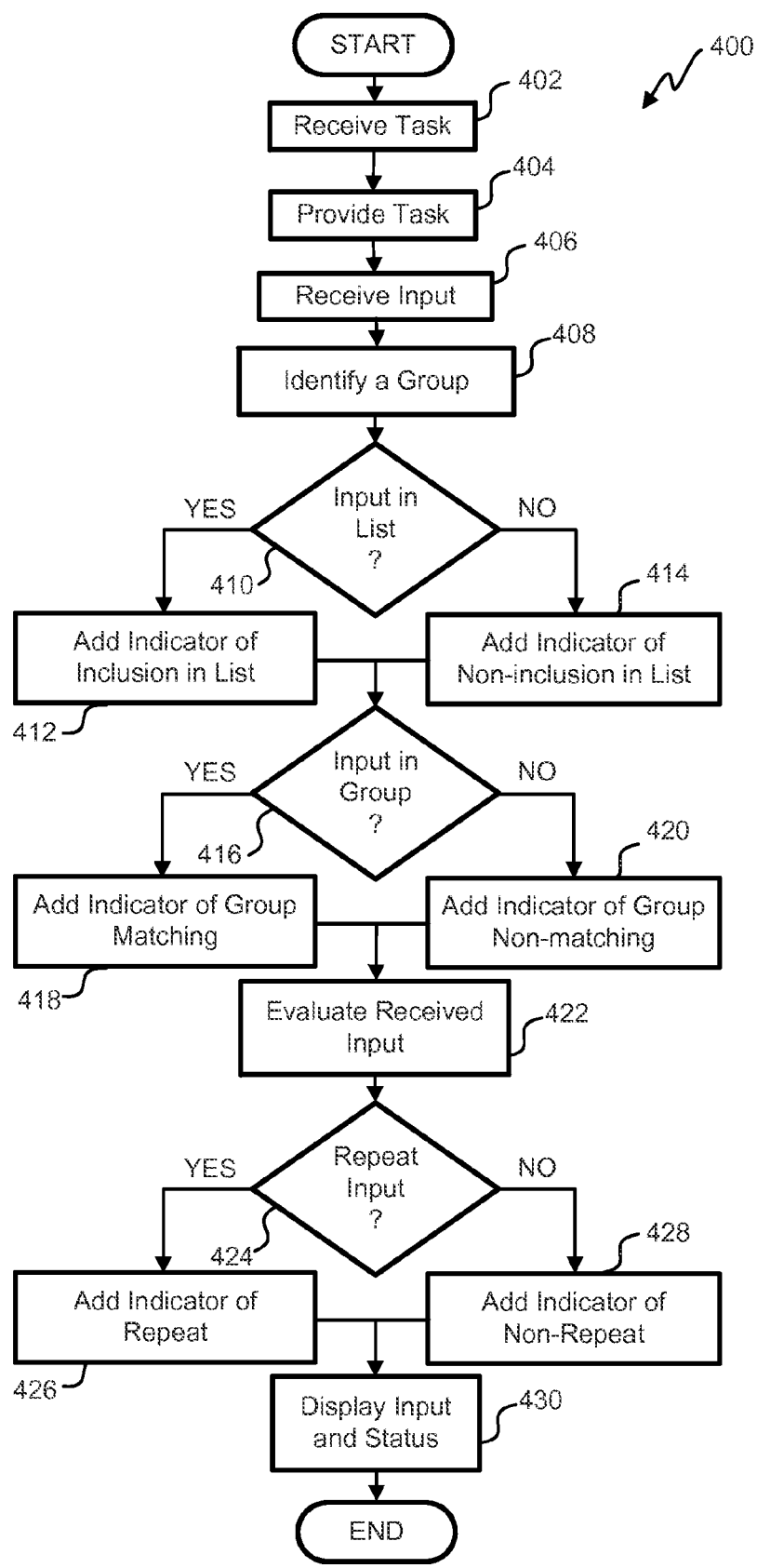
FIG. 4 is a flowchart illustrating one embodiment of a process for dynamic response entry.

With reference now to FIG. 4, a flowchart illustrating one embodiment of a process 400 for dynamic response entry is shown. In some embodiments, for example, the process 400 can be performed by the system 100 and/or one or several components of the system 100.

The process 400 begins at block 402 wherein a task and/or question is received. In some embodiments, for example, receiving the task and/or question can include querying at least one of the databases 104 for information relating to the task and/or question. In some embodiments, for example, receiving the task and/or question can include the process of evaluating the test located in the testing database 104-B, compiling the testing battery with tasks from the testing database 104-B, storing the testing battery within the battery database 104-C, identifying a testing battery stored in the battery database 104-C and associated with the testee, retrieving the identified testing battery from the database 104-C, identifying a task and/or question associated with the testing battery stored in the battery database 104-C and any list associated with the task and/or question, and retrieving the identified task and/or question and any list associated with the task and/or question from the list database 104-D.

After the task has been received, the process 400 proceeds to block 404 wherein the task and/or question is provided. In some embodiments, for example, the task and/or question can be provided to a user such as the proctor and/or the testee. The task and/or question can, for example, be provided to the user by at least one of the user devices 106, and specifically by, for example, the user interface 202 of the user device 106. In some embodiments, the task and/or question can comprise a request for a user such as the testee to take some action, which can include, for example, after being temporarily provided with a list of items such as, for example, names of objects, recalling as many of the items as possible.

After the task has been provided, the process 400 proceeds to block 406 wherein the input and/or answer is received. The input and/or answer can be received in response to the provided task. In some embodiments, for example, the input can be received by at least one of the user devices 106, and in some embodiments, the input can be received from the proctor device 106-A. The received input and or answer can be stored in, for example, one of the databases 104 such as the response database 104-E. In some embodiments, for example, the receipt of the input and/or answer can further comprise determining the format and/or data type of the input and/or answer and determining whether the format and/or data type of the input and/or answer is a desired format and/or data type such as, for example, the format and/or data type matching the format and/or data type of the list data retrieved from the list database 104-D. If the format and/or data type of the input does not match the desired format and/or data type, receiving the input and/or answer can further comprise converting the format and/or data type of the input to match and/or correspond to the format and/or data type of the list data.

After the input has been received, the process 400 proceeds to block 408 wherein a group is identified. In some embodiments, for example, the group can be identified by retrieving this data from the list database 104-D including group data. This group data can identify a group associated with one or several of the items in the list.

After the group has been identified, the process proceeds to decision state 410 wherein it is determined if the received input is in the list. In some embodiments, this determination can include comparing the input to items on the list and determining whether the input is on the list. In some embodiments, for example, this can include identifying, according to a Boolean function, inputs identified in the list data. If it is determined that the input is on the list, then the process 400 proceeds to block 412 wherein an indicator of the input's inclusion on the list is provided. In some embodiments, for example, the providing of the indicator of the input's inclusion on the list can include, for example, the addition of an indicator to the response database 104-E. In some embodiments, for example, the indicator can comprise a first Boolean value corresponding to a "true" condition. Returning again to decision state 410, if it is determined that the input is not on the list, then the process 400 proceeds to block 414, wherein an indicator of the non-inclusion of the input on the list is provided. In some embodiments, for example, the providing of the indicator of the non-inclusion of the input on the list can include, for example, the addition of an indicator to the response database 104-E. In some embodiments, for example, the indicator can comprise a second Boolean value corresponding to a "false" condition.

After the indicator of the inclusion and/or non-inclusion of the input in the list is added, the process 400 proceeds to decision state 416 wherein it is determined if the input is in a group. In some embodiments, this determination can include comparing the group associated with the input groups associated with the items on the list and determining whether the group associated with the input matches one of the groups associated with the items on the list. In some embodiments, for example, this can include identifying, according to a Boolean function, whether the group associated with the input matches at least one group associated with at least one of the items on the list. If it is determined that the group associated with the input matches one of the groups associated with at least one of the items on the list, then the process 400 proceeds to block 418 wherein an indicator of the matching group is provided. In some embodiments, for example, the providing of the indicator of the matching group can include, for example, the addition of an indicator to the response database 104-E. In some embodiments, for example, the indicator can comprise a first Boolean value corresponding to a "true" condition.

Returning again to decision state 416, if it is determined that the group associated with the input does not match a group associated with at least one of the items on the list, then the process 400 proceeds to block 420, wherein an indicator of the non-matching group is provided. In some embodiments, for example, the providing of the indicator of the non-matching group can include, for example, the addition of an indicator to the response database 104-E. In some embodiments, for example, the indicator can comprise a second Boolean value corresponding to a "false" condition.

After the indicator of the group matching and/or non-matching is added, the process 400 proceeds to block 422 wherein the received input is evaluated. In some embodiments, for example, the evaluation of the received input can be performed by, for example, a component of the system 100 such as, for example, the processor 102, at least one of the user devices 106, and/or the user terminal 110. In some embodiments, for example, the evaluation can include evaluating the received input for repeat and/or synonym status.

After the received input is evaluated, the process 400 proceeds to decision state 424 wherein it is determined if the input is a repeat input. In some embodiments, this determination can include comparing response data from the response database 104-E with the received input to determine if the received input matches a previously received input. In some embodiments, for example, this determination can include identifying any inputs provided in response to a question and/or task and comparing the received input to the identified inputs. In some embodiments, for example, this can include determining, according to a Boolean function, whether the received input is a repeat of one of the identified inputs.

If it is determined that the received input is a repeat of one of the identified inputs, then the process 400 proceeds to block 426 wherein an indicator of the repeat input is provided. In some embodiments, for example, the providing of the indicator of the repeat input can include, for example, the addition of an indicator to the response database 104-E. In some embodiments, for example, the indicator can comprise a first Boolean value corresponding to a "true" condition.

Returning again to decision state 424, if it is determined that the received input is not a repeat of one of the identified inputs, then the process 400 proceeds to block 428, wherein an indicator of the repeat input is provided. In some embodiments, for example, the providing of the indicator of the non-repeat input can include, for example, the addition of an indicator to the response database 104-E. In some embodiments, for example, the indicator can comprise a second Boolean value corresponding to a "false" condition.

After the indicator of the repeat and/or non-repeat input is added, the process 400 proceeds to block 430 wherein the input and status is displayed. In some embodiments, for example, the input and status can be displayed in the answer list 302 of the user interface 202. In some embodiments, for example, this display in the answer list 302 of the user interface 202 can be performed on at least one of the user devices 106, and in some embodiments on the proctor device 106-A.

Figure 5:
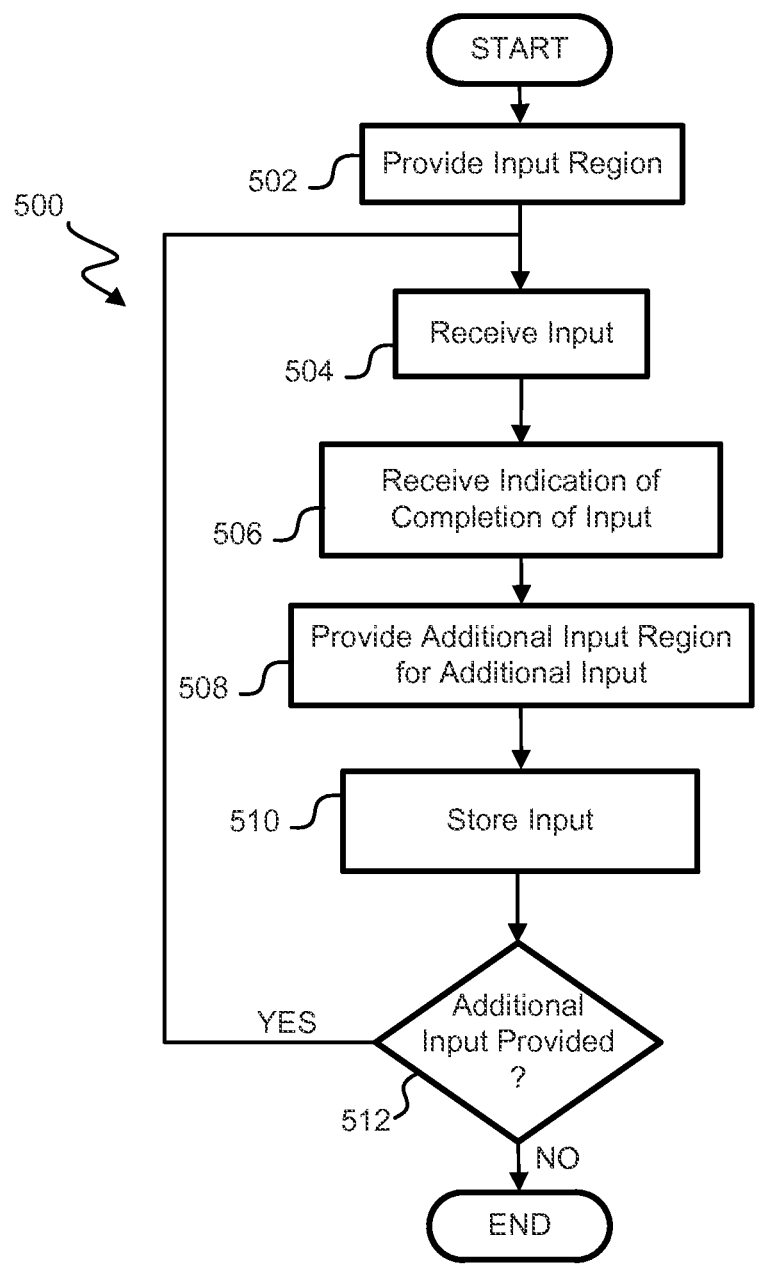
FIG. 5 is a flowchart illustrating one embodiment of a process for receiving an input.

With reference now to FIG. 5, a flowchart illustrating one embodiment of a process 500 for receiving an input is provided. In some embodiments the process 500 can be performed as a sub-process within block 406 of FIG. 4. The process 500 can be performed by the system 100 and/or a component of the system 100.

The process 500 begins at block 502 wherein an input region is provided. In some embodiments, for example, the input region can comprise a portion of the user interface 202 such as, for example, the button region 308 and/or the manual input region 314 of the user interface 202 displayed in FIG. 3. In one embodiment, the input region comprises the display box 318, and can comprise, for example, the first display box 318-A of the manual input region 314. In some embodiments, the providing of the input region can include providing the user interface 202 as shown in FIG. 3, or any of the portions thereof including, for example, the button region 308.

After the input has been provided, the process 500 proceeds to block 504 wherein an input is received. In some embodiments, for example, the input can be received by the interaction of the user such as the proctor with the user interface 202. In one particular embodiment, for example, the input can be received by the interaction of the user such as the proctor with the manual input region 314 of the user interface. This interaction can include, for example, the proctor handwriting the input into the first display box 318-A.

After the input is received, the process 500 proceeds to block 506 wherein an indication of the completion of the input is received. In some embodiments, for example, the indication the completion of the input can be received by the system 100 and/or a component of the system 100 such as, for example, at least one of the user devices 106. In some embodiments, for example, the indication of the completion of the input can comprise the operation the button 316 by the user such as the proctor, a lapse of the designated period of time during which no user input is received, and/or the receipt of an additional input. In some embodiments, for example, the receipt of an additional input can be determined by identifying the start of providing an additional input into, for example, an additional display box 318 such as, the second display box 318-B of the manual input region 314. In some embodiments, an input status can be determined for the received input according to process 400 of FIG. 4.

After the indication of the completion of the input is received, the process 500 proceeds to block 508 wherein an additional input region is provided for an additional input. In some embodiments, for example, the additional input region can comprise a portion of the user interface 202 such as, for example, the button region 308 and/or the manual input region 314 of the user interface 202 displayed in FIG. 3. In one embodiment, the input region comprises the display box 318, and can comprise, for example, the second display box 318-B of the manual input region 314. In some embodiments, in which the first and second display boxes 318-A, 318-B are simultaneously provided, the step of block 508 can be performed simultaneously with the step of block 502, and in some embodiments in which the first and second display boxes 318-A, 318-B are serially provided, the step of block 508 can be performed in response to the receipt of an indication of the completion of an input in a display box 318.

After the additional input region is provided for the additional input, the process 500 proceeds to block 510 wherein the received input is stored. In some embodiments, for example, the received input can be stored in a component of the system 100 such as, for example, one of the databases 104, and specifically in the response database 104-E.

After the received input is stored, the process 500 proceeds to decision state 512 wherein it is determined if an additional input is being provided. In some embodiments, for example, this determination can include determining whether an additional input is being provided in, for example, the additional display box 318 such as the second display box 318-B of the manual input region 314. If it is determined that an additional input is being provided, the process 500 returns to block 504. If it is determined that no additional input is being provided, the process 500 can terminate and or proceed to block 408 of FIG. 4.

Figure 6:
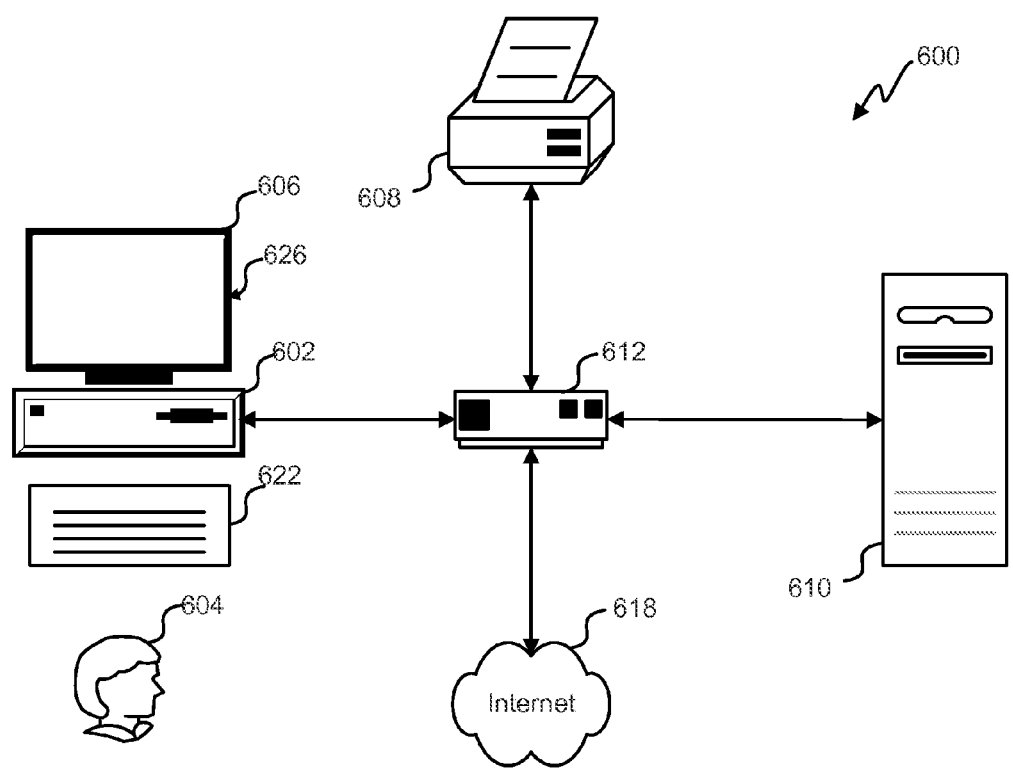
FIG. 6 is a schematic illustration of an exemplary environment with which embodiments may be implemented is shown with a computer system.

With reference now to FIG. 6, an exemplary environment with which embodiments may be implemented is shown with a computer system 600 that can be used by a user 604 as all or a component of the system for dynamic response entry 100. The computer system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. The monitor 606 can be a CRT, flat screen, etc.

A user 604 can input commands into the computer 602 using various input devices, such as a mouse, keyboard 622, track ball, touch screen, etc. If the computer system 600 comprises a mainframe, a designer 604 can access the computer 602 using, for example, a terminal or terminal interface. Additionally, the computer system 626 may be connected to a printer 608 and a server 610 using a network router 612, which may connect to the Internet 618 or a WAN.

The server 610 may, for example, be used to store additional software programs and data. In one embodiment, software implementing the systems and methods described herein can be stored on a storage medium in the server 610. Thus, the software can be run from the storage medium in the server 610. In another embodiment, software implementing the systems and methods described herein can be stored on a storage medium in the computer 602. Thus, the software can be run from the storage medium in the computer system 626. Therefore, in this embodiment, the software can be used whether or not computer 602 is connected to network router 612. Printer 608 may be connected directly to computer 602, in which case, the computer system 626 can print whether or not it is connected to network router 612.

Figure 7:
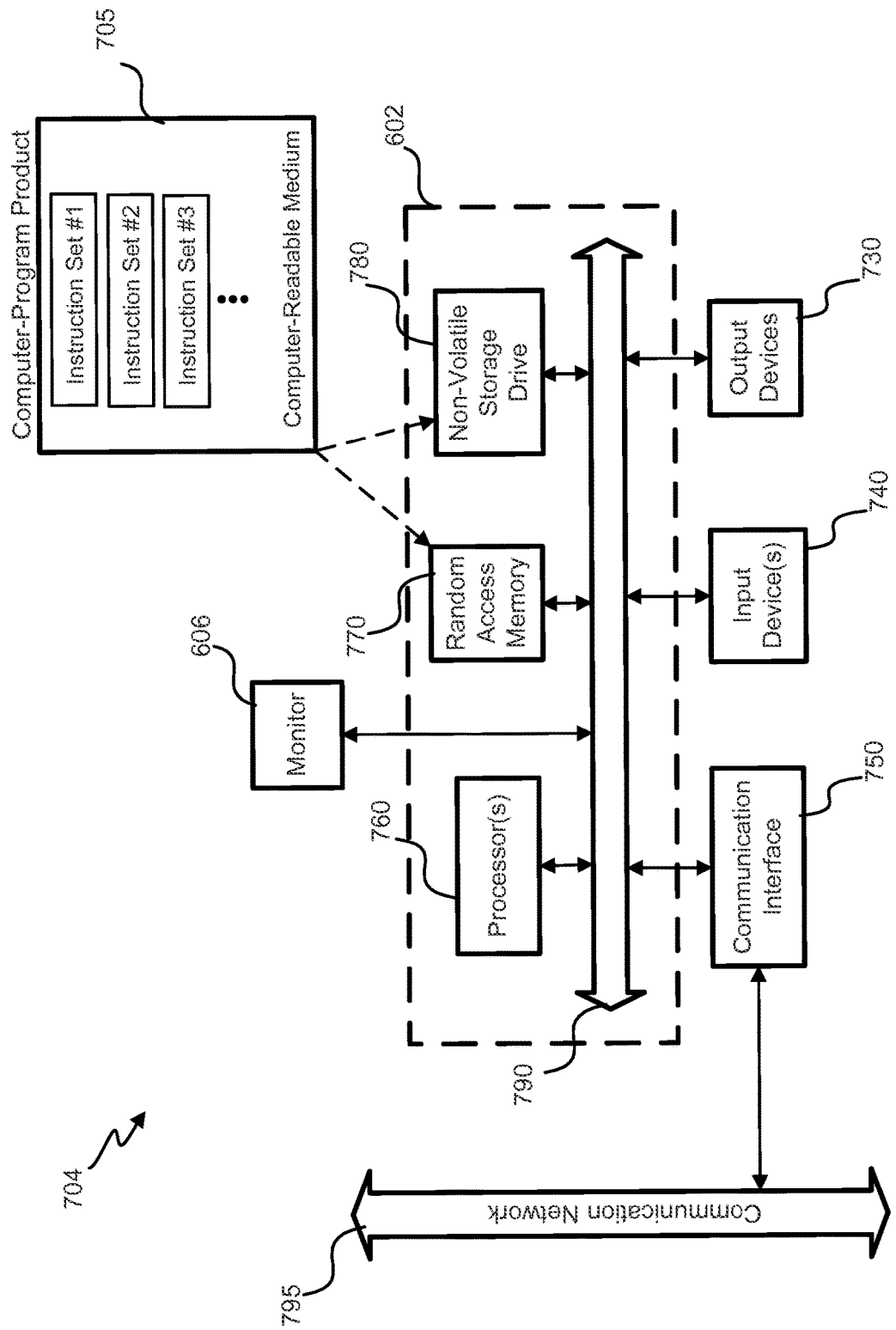
FIG. 7 is a schematic illustration of one embodiment of a special-purpose computer system.

With reference to FIG. 7, an embodiment of a special-purpose computer system 704 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose computer system 704.

Special-purpose computer system 704 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs system 704 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft® Corporation, Solaris® from Oracle®, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks 795 and devices and may serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD- ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within the computer 602.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A method of dynamic response entry enabled by a dynamic response entry system via a communication network, the method comprising:

receiving a task at a proctor device from a battery database, wherein the battery database comprises a plurality of tasks associated with a test;

receiving list data at the proctor device from a list database, wherein the list data comprises data indicating a plurality of items;

providing a task to a user device, wherein the proctor device and user device are components of the dynamic response entry system that are enabled to communicate with each other in the dynamic response entry system across the communication network, wherein the providing the task to the user device comprises temporarily displaying the list to the user and requesting the user to identify the items from the list;

providing a user interface with the proctor device, the user interface comprising an input region simultaneously displaying a first handwriting input region and a second handwriting input region;

receiving a first input at the proctor device, wherein the first input comprises an electronic capture of handwriting indicating a user identified item in the first handwriting input area;

receiving at the proctor device an indication of the completion of the providing of the first input to the first handwriting input area;

determining with the proctor device when an additional input is provided, wherein determining when the additional input is provided comprises:

determining whether a signal indicative of an input in the second handwriting input area is received; and upon receiving the signal indicative of the input in the second handwriting input area, storing the first input.

2. The method of claim 1, further comprising displaying the first input in an answer list.

3. The method of claim 2 further comprising determining a status of the first input.

4. The method of claim 3, wherein the status of the first input indicates at least one of whether the input is included in a list or group and whether the input is a repeat input.

5. The method of claim 4, further comprising determining the status of the first input, wherein determining the status of the first input comprises retrieving categorization data from a database and comparing the categorization data to the first input.

6. The method of claim 5, wherein the categorization data comprises one of list data, wherein the list data comprises data indicating a plurality of items, group data, wherein the group data identifies a subset of the plurality of items in the list data, and input data, wherein the input data identifies a previously received input.

7. The method of claim 1, further comprising providing a button region to the user, wherein the button region comprises a plurality of input buttons.

8. The method of claim 7, wherein providing the button region comprises generating the plurality of input buttons.

9. The method of claim 8, wherein each of the plurality of input buttons is associated with an item identified in list data, wherein the list data comprises data indicating a plurality of items.

10. A dynamic response entry system for dynamic response entry, the dynamic response entry system comprising:

a communication network that enables components of the dynamic response entry system to communicate with each other, including a proctor device and a user device;

a memory comprising:
a battery database comprising a plurality of tasks associated with a test; and
a list database, wherein the list database comprises list data indicating a plurality of items;

the proctor device communicatively connected with the memory, wherein the proctor device is configured to:
receive a task from the battery database;
receive list data from the list database;
provide a task to the user device, wherein the task comprises a temporary display of the list data to a user;
provide a user interface, the user interface comprising an input region simultaneously displaying a first handwriting input area and a second handwriting input area;
receive a first input, wherein the first input comprises the electronic capture of handwriting indicating a user identified item in the first handwriting input area;
receive an indication of the completion of the providing of the first input;
determine when an additional input is provided, wherein determining when an additional input is provided comprises:
determining whether a signal indicative of an input in the second handwriting input area is received; and
upon receiving the signal indicative of the input in the second handwriting input area, store the first input.

11. The dynamic response entry system of claim 10, wherein the proctor device is further configured to display the first input in an answer list.

12. The dynamic response entry system of claim 11, wherein the proctor device is further configured to determine a status of the first input.

13. The dynamic response entry system of claim 12, wherein the status of the first input indicates at least one of whether the input is included in a list or group and whether the input is a repeat input.

14. The dynamic response entry system of claim 13, wherein the proctor device is further configured to determine the status of the first input, wherein determining the status of the first input comprises retrieving categorization data from a database and comparing the categorization data to the first input.

15. The dynamic response entry system of claim 14, wherein the categorization data comprises one of the list data, group data, and input data, wherein the list data comprises data indicating a plurality of items, wherein the group data identifies a subset of the plurality of items in the list data, and wherein the input data identifies a previously received input.

16. The dynamic response entry system of claim 10, wherein the proctor device is further configured to provide a button region to the user, wherein the button region comprises a plurality of input buttons.

17. The dynamic response entry system of claim 16, wherein providing the button region comprises generating the plurality of input buttons.

18. The dynamic response entry system of claim 17, wherein each of the plurality of input buttons is associated with an item identified in list data, wherein the list data comprises data indicating a plurality of items.

* * * * *